J. Humphrey,
Pump Brake.
No. 111,748. Patented Feb. 14, 1871.
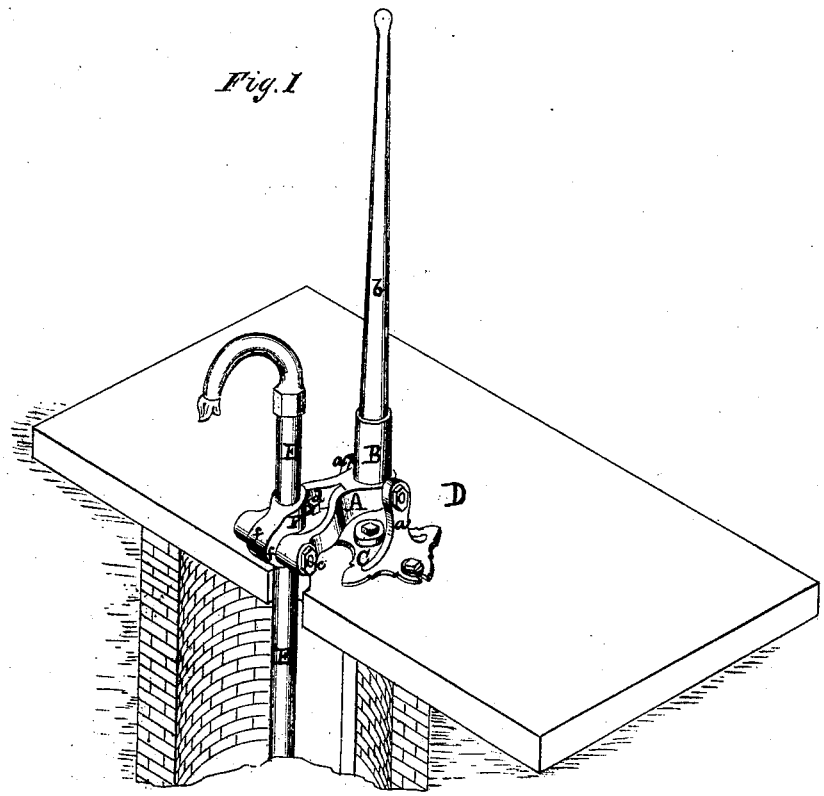
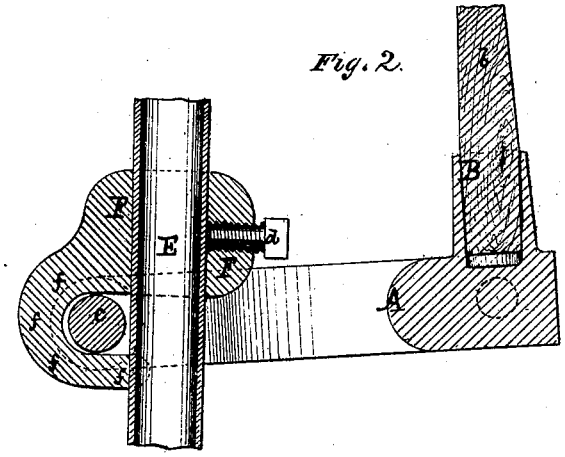

United States Patent Office.

JOHN HUMPHREY, OF KEENE, NEW HAMPSHIRE, ASSIGNOR TO JAMES WILSON, OF BRIDGEPORT, CONNECTICUT.

Letters Patent No. 111,748, dated February 14, 1871.

IMPROVEMENT IN PUMPS.

The Schedule referred to in these Letters Patent and making part of the same.

*To all whom it may concern:*

Be it known that I, JOHN HUMPHREY, of Keene, in the county of Cheshire and State of New Hampshire, have invented a new and useful Improvement in Brake Mechanism for Operating Pumps; and I hereby declare that the following is a full, clear, and exact description of the same, reference being had to the accompanying drawing which forms a part of this specification.

My invention relates to an improvement in the kind of brake mechanism, especially designed for moving in as nearly a vertical line as possible, the stem connected to the piston in that class of pumps which discharges the liquid through a tubular piston stem; and My invention consists in the combination of a collar for the discharge-pipe, provided with a hook or loop for encircling the bolt or pin extending across the bifurcated end of the horizontal arm of the operating lever, whereby I am enabled to simplify the construction and considerably reduce the cost in the manufacture of the kind of brake mechanism above referred to, and, at the same time, produce a brake thoroughly efficient in all respects.

In the accompanying drawing—

Figure 1 is a perspective view of my invention, and

Figure 2, a central vertical section of the same.

A designates the horizontal, and

B, the vertical arm of the operating lever.

This lever is pivoted at or near the angle formed by the junction of the two arms A B in standards *a a* rising from a suitable base-plate, C, which latter is designed to be secured in the ordinary way to the platform D, as will be understood by reference to fig. 1.

The arm A of the operating-lever is, preferably, a socket, into which a wooden handle or lever, *b*, is inserted, and the horizontal arm B is bifurcated, so as to straddle the piston-stem or discharge-pipe E, and these forks are connected at their forward ends by a pin, *c*.

F designates a collar, the opening in which is of a size to allow of the discharge-pipe with which it is to be used being run through it.

This collar is adjusted and secured in any position upon the said pipe by a set-screw, *d*, which passes through the collar and abuts against the pipe. And said collar is provided with a hook or loop, *f*, which is curved, so as to embrace or form a box or socket for the pin *c*, (see fig. 2,) its embrace being sufficiently loose to permit the said pin to turn or partially revolve within the said hook as the lever is operated, so that the pipe shall not be swerved to any material extent from a vertical line, as the forward end of the horizontal arm of the lever describes its arc of travel.

This mode of connecting the lever to the piston-rod requires very little labor in fitting the parts after they have been cast, and it constitutes an adjustable connection that is very efficient, and considerably lessens expense in the manufacture of this kind of brake mechanism.

What I claim as my invention, and desire to secure by Letters Patent, is—

In a brake mechanism for operating the piston-stem or discharge-pipe of a pump, the combination of a collar, F, provided with the hook or loop *f*, with the pin or bar *c* connected to the horizontal arm A of the operating-lever A B, substantially as and for the purposes herein specified.

JOHN HUMPHREY.

Witnesses:
M. M. LIVINGSTON,
T. B. BEECHER.